United States Patent
Guigui

(10) Patent No.: US 7,548,985 B2
(45) Date of Patent: Jun. 16, 2009

(54) SYSTEM FOR MANAGING USER PROFILE DATA

(75) Inventor: Alain Guigui, Bresson (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 1072 days.

(21) Appl. No.: 10/649,976

(22) Filed: Aug. 26, 2003

(65) Prior Publication Data
US 2004/0186901 A1 Sep. 23, 2004

(30) Foreign Application Priority Data
Sep. 5, 2002 (EP) .................................. 02354135

(51) Int. Cl.
G06F 15/16 (2006.01)
(52) U.S. Cl. ...................................... 709/231; 709/249
(58) Field of Classification Search ................. 709/231, 709/249
See application file for complete search history.

(56) References Cited

U.S. PATENT DOCUMENTS

| 5,901,352 | A | 5/1999 | St.Pierre et al. | |
|---|---|---|---|---|
| 6,496,855 | B1 * | 12/2002 | Hunt et al. | 709/217 |
| 6,678,516 | B2 * | 1/2004 | Nordman et al. | 709/203 |
| 6,732,181 | B2 * | 5/2004 | Lim et al. | 709/229 |
| 2001/0034771 | A1 | 10/2001 | Hutch et al. | |
| 2002/0129088 | A1 * | 9/2002 | Zhou et al. | 709/200 |
| 2002/0138563 | A1 * | 9/2002 | Trivedi | 709/203 |
| 2004/0019900 | A1 * | 1/2004 | Knightbridge et al. | 725/23 |
| 2005/0192008 | A1 * | 9/2005 | Desai et al. | 455/435.2 |

FOREIGN PATENT DOCUMENTS

| WO | WO 00/67436 | 11/2000 |
|---|---|---|
| WO | WO 02/45344 | 6/2002 |
| WO | WO 02/51074 | 6/2002 |

OTHER PUBLICATIONS

Pfeifer, Tom, et al., "A Modular Location-Aware Service and Application Platform", Computers and Communications, 1999. Proceedings. IEEE International Symposium on Red Sea, Egypt Jul. 6-8, 1999, Los Alamitos, CA, USA, IEEE Comput. Soc., US, Jul. 6, 1999, pp. 137-148, XP010344156.
Chatzipapadopoulos, F., et al, "Harmonised Internet and PSTN Service Provisioning", Computer Communications, Elsevier Science Publishers BV, Amsterdam, NL, vol. 23, No. 8, Apr. 2000, pp. 731-739, SX004192593, ISSN: 0140-3664.

* cited by examiner

Primary Examiner—Phuoc Nguyen

(57) ABSTRACT

In a communications environment, a system for managing user profile data comprises a network interface layer operatively associated with a communications network and a storage layer operative to store user profile data relating to the communications network. the system further comprising a data conversion layer functionally disposed between the network interface and the data storage layers. the data conversion layer is capable of converting the user profile data into a plurality of communication network formats.

16 Claims, 3 Drawing Sheets

FIGURE 2

| Field | Utility | Dynamic/ Static | Transient/ Persistent | Shared/Not Shared by Service Providers | Public/ Private | Local/ Remote | Distributed/ Non Distributed |
|---|---|---|---|---|---|---|---|
| Identity | | | | | | | |
| User Name | | S | P | S | Public | L or R | D |
| User ID | | S | P | S | Public | L or R | D |
| User IP | Depends on IP version v4 or v6 | S or D | T or P | | | | |
| Contact Points | | | | | | | |
| Mobile no. | | S | P | | | | |
| Fixed no. | | S | P | | | | |
| User e-mail | | S | | S | P | | D |
| Sync among domains: user migrating profiles: LNP analogy: User Profile Portability | | | | | | | |
| Location of user's SIP proxy | | | | | | | |
| Contextual Information | | | | | | | |
| User's usual location | | | | | | | |
| User's Current Location | | D | T | | | | |
| Reference to User's current session manager | | | | | | | |
| Security Credentials | | | | | | | |
| List of authorized domains | | | | | | | |
| Login policy (expiration) | | | | | | | |
| Current Status Authentication State (Trustable or Not, Declared Bad Identity) | | | | | | | |
| User's PKI certificate key print | | | | | | | |

FIGURE 3

| Main Parameters | Parameters | Value | Sub-Parameters | Sub Value | Distributed/ Non-Distributed | Comments | Shared/ Not Shared | Comments |
|---|---|---|---|---|---|---|---|---|
| Operator Hosted Common Profile | | | | | | | | |
| | Last Name | Smith | | | Yes | Peggy wants to provide this data to her operator just once, so this parameter will be distributed from the operator (UPMS) to each subscribed service provider infrastructure. | No | Mobile Operator has agreements with tens of service providers. Peggy doesn't want to be offered services by all of them so her name will be not SHARED by all of them. This could have been different if Peggy wanted to be offered many new services. |
| | First Name | Peggy | | | Yes | "Ditto" | No | "Ditto" |
| | E-mail | peggy@isp.com | | | Yes | "Ditto" | No | "Ditto" |
| | List of Subscribed Services | Flight Service | Service Provider | Airport Service | No | Mobile Operator will not distribute the subscribed services information to any service provider. It will be used by mobile operator for internal use such as service access control. | No | A given service provider (Airport Service) will not share with other Service Providers (Movie Service) the list of services (Flight Services) Peggy has subscribed to. |
| | Prepaid Account | | | | No | Mobile Operator will not distribute the prepaid account, it will provide access to Peggy's prepaid account. | Yes | The same prepaid account will be shared by different service providers. |
| Airport Service Profile Repository | Peggy Smith | Airport Service | | | | | | |
| | Subscribed Service | Flight Service | | | No | Mobile Operator will not distribute the fact that Peggy has subscribed to this service to other service providers than Airport Service. | No | Related only to Peggy and Movie Service. |
| | Billing Mode | Prepaid | | | Yes | Peggy wants to billed always on the same prepaid account whatever the services she uses. So the fact that she will be billed with her prepaid has to be distributed. | Yes | The same prepaid account will be shared by different service providers They will share the reference of the prepaid account. |
| | Prepaid Account | | | | No | Mobile Operator will not distribute the prepaid account, it will provide access to Peggy's prepaid account. | Yes | The same prepaid account hosted by the Mobile Operator will be shared by different service providers. |
| Movie Service Profile Repository | | Movie Service | | | | | | |
| | Subscribed Service | | | | | | | |
| | Video Preferences | Spy Movies | | | No | | No | Concern only Peggy and Movie Service. |
| | Billing Mode | Prepaid | | | Yes | Peggy wants to be billed always on the same prepaid account whatever the services she uses. So the fact that she will be billed with her prepaid has to be distributed. | Yes | The same prepaid account will be shared by different service providers. They will share the reference of the prepaid account. |
| | Prepaid Account | | | | No | Mobile Operator will not distribute the prepaid account, it will provide access to Peggy's prepaid account. | Yes | The same prepaid account will be shared by different service providers. |

SYSTEM FOR MANAGING USER PROFILE DATA

BACKGROUND TO THE INVENTION AND SUMMARY OF THE PRIOR ART

This invention relates broadly to the field of communications and relates, more specifically, to the gathering, processing and use of user-specific information, referred to hereinafter as "user profile data".

In today's electronic world, in which people make use of a multiplicity of communications systems and services, it is important—both for service subscribers and providers—for users' profile data to be widely disseminated (subject to important privacy and security constraints) to allow personalisation of a number of services to be effected.

In telecommunications environments, the use of user profile data can be important not only from a practical viewpoint, in that the current physical location of a mobile subscriber must always be known for a mobile communications system to operate satisfactorily, but also, for example, from financial perspectives, in that mobile operators are able to recommend particular call tariffs in accordance with the nature, time, frequency and duration of calls made. Similarly, variations in users' whereabouts, throughout the day, can be accommodated by the use of so-called "Follow Me" services in which a subscriber can specify several alternative numbers which can be tried, in succession, in order to locate the subscriber at a given time.

From an Internet perspective, it has hitherto usually been the case that Internet shoppers and the like have had to provide e-tailers with personal information each time a purchase is made, which naturally gives rise to a labour-intensive and somewhat tedious on-line shopping experience. Although, over recent years, this latter phenomenon has become less prevalent, as a result of the use of what might be called "unitary" portals, such as Microsoft's Passport™ service, such approaches are still considered to offer a less-than-perfect solution, not least in view of perceived privacy and security concerns, and a lack of cross-platform compatibility.

Other, more general, proposals in the field of information access include directory-based access protocols in which specific items of personal information (such as e-mail addresses and public keys) are obtainable using a hierarchical directory system. These include the Lightweight Directory Access Protocol (LDAP)—an open protocol that allows user-specified network resources to be sought on the basis of the resource attributes (i.e. what it is, rather than where it might be found). However, the services (i.e. resources) made available using such protocols are non-personalised, meaning that even an authorised subscriber is likely only to have access to a directory of resources that are not subscriber-specific and which may not, therefore, provide the subscriber with exactly what is required.

It is a primary object of the present invention to provide, particularly in a communications environment, a system for managing user profile data that overcomes or at least reduces these and other drawbacks.

SUMMARY OF THE INVENTION

In accordance with a first aspect of the present invention, there is provided, in a communications environment, a system for managing user profile data, comprising:

a) a network interface layer operatively associated with a communications network, b) a data storage layer, operative to store user profile data relating to the communications network, and c) a data conversion layer, functionally disposed between the network interface and the data storage layers and which is capable of converting the user profile data into a plurality of communications network formats.

The data conversion layer may be capable of making bi-directional contact with the network interface layer whereby a plurality of communications network data formats may be converted into a user profile data format compatible with the data storage layer.

In this way, user profile data obtained from the communications networks may be passed to and obtained from the data storage layer, whereby a user profile "bank" may be established and whereby services provided using the communications networks may be tailored in accordance with aspects of the stored user profile data.

Moreover, the provision of such a versatile data conversion layer enables the management system to operate on a cross-platform basis, regardless of the underlying infrastructure, communications device being used or location of the subscriber.

The user profile data preferably is provided in a single or substantially single format, thus allowing a somewhat unified profile to be built up. Similarly, the use of a single or substantially single format allows the user profile data readily be to processed, sorted, conveyed and manipulated, with it being preferable to employ a tagged or tag-based format. Conveniently, the user profile data is provided using an Internet mark-up language such as XML (Extensible Mark-Up Language).

The use of a mark-up language of this type allows the content of a user's profile to be defined by the use of appropriate tags or headers which may, if desired, be varied or added to as and when appropriate. The compatibility of XML with HTTP is also an important aspect of the invention, as it allows user-driven amendments to a profile to be made using a standard Internet connection and browser.

The system preferably further comprises an aggregation layer operative to convene user profile data relating to a plurality of different communications networks.

The aggregation layer may have a push/pull relationship with the data conversion and data storage layers. The push/pull relationship may be enabled by a publish/subscribe system and may thus conveniently employ a publish/subscribe communication bus.

The aggregation layer may comprise a data store selector operative to effect storage of user profile data in appropriate sectors of the data storage layer. The data storage layer may comprise a rules repository accessible by the aggregation layer, the rules contained within the repository influencing the operation of the aggregation layer.

The system may further comprise a user access module operative to receive information from a user or subscriber and to effect or request a change, where appropriate, in the user profile data contained within the data storage layer.

Preferably, the user access module forms part of the network interface layer.

Conveniently, the user access module is receptive to information transmitted using a web-based protocol such as HTTP. In this way, users/subscribers may update their profile, contained within the data storage layer, by accessing it using a web-based client such as an Internet browser.

In accordance with a second aspect of the present invention, there is provided, in a communications environment, a system for managing user profile data, comprising:

a) a network interface layer operatively associated with a plurality of different communications networks, b) a data storage layer, operative to store user profile data relating to the communications networks, and c) a data conversion layer, functionally disposed between the network interface and data storage layers and which is capable of effecting a conversion between a plurality of communications network formats and a user profile format, whereby a plurality of communications networks may have access to the data storage layer, thus enabling services to be provided using such networks that are tailored in accordance with the user profile data.

The network interface layer may be operatively associated with a plurality of communications networks such as mobile telecommunications, public switched telephone, enterprise and Internet networks.

The invention, in its second aspect, may comprise one or more of the features of the first aspect of the present invention.

BRIEF DESCRIPTION OF THE DRAWINGS

Specific and non-limiting embodiments of the invention will now be described, strictly by way of example only, by reference to the accompanying drawings, of which:

FIG. 2 is an example of user profile data content, shown in a tabular manner; and FIG. 3 is a further example of user profile data content, along the lines of FIG. 2, showing a specific implementation of the invention in a 3GPP environment.

DETAILED DESCRIPTION AND BEST MODE OF THE INVENTION

Figure 1:
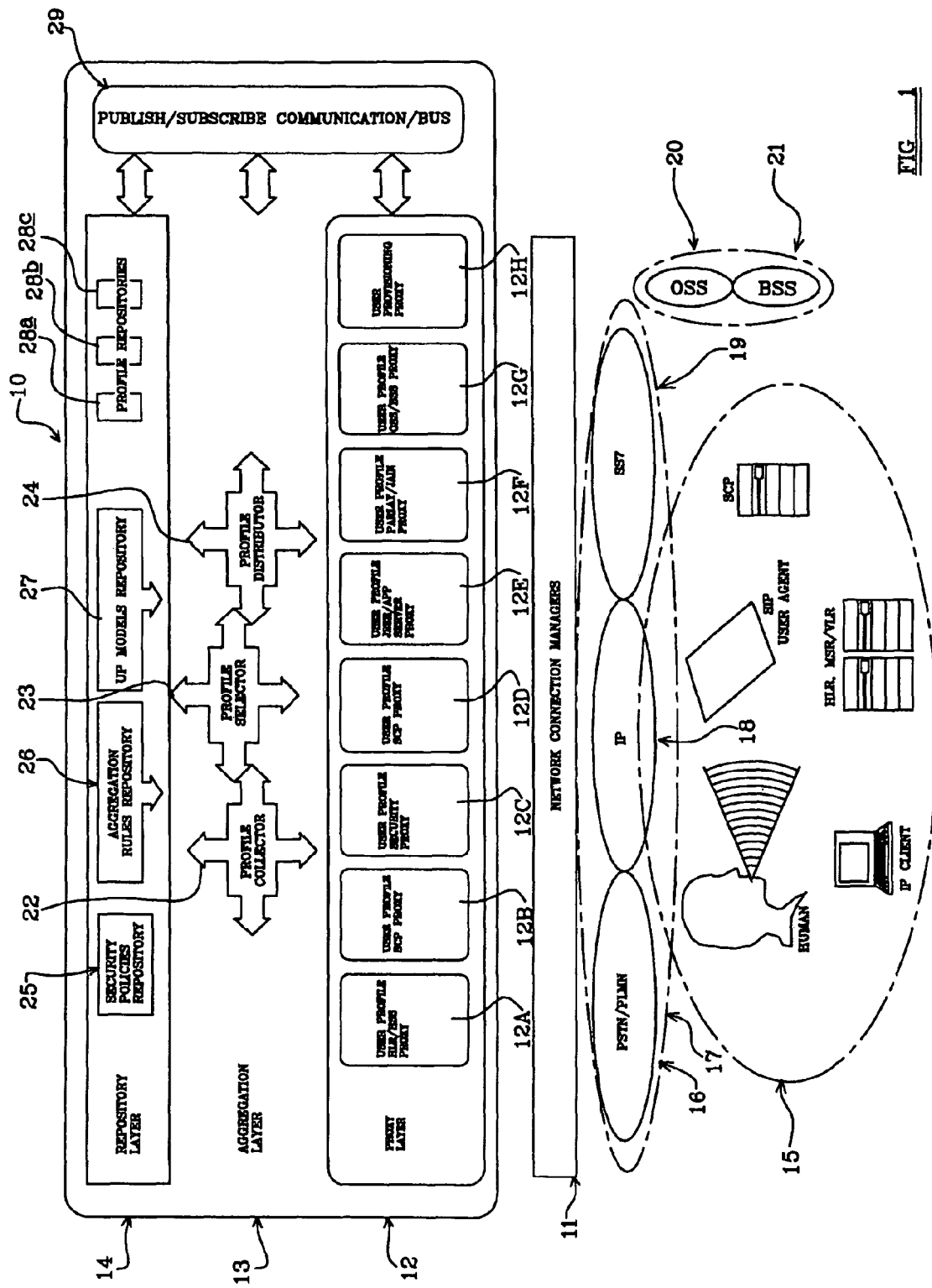
FIG. 1 illustrates, in schematic form, the various components of the management system and the relationships existing between the various layers and components thereof.

Referring to FIG. 1, a User Profile Management System (UPMS) 10 comprises a network interface layer 11, a data conversion layer 12, an aggregation layer 13 and a data storage layer 14.

The network interface layer 11 lies between the data conversion layer 12 and a plurality of underlying communications networks 15. As shown, the networks 15 may include a Public Switched Telephone Network (PSTN) 16, a Public Land Mobile Network (PLMN) 17, an Internet Protocol (IP) network 18 and a signalling network—Signalling System 7 (SS7)—network 19. The various communications networks 15 are operative, in conventional manner, to provide an array of communications services that support voice call transactions, IP client connectivity and a range of signalling-based communications protocols such as SIP (Session Initiation Protocol) connectivity and data transfers such as occur (in a GSM environment) between Home Location Registers (HLR's), Visitor Location Registers (VLR's), Mobile Switching Centres (MSC's) and Service Control Points (SCP's). In addition, the network interface layer is operatively associated with telecommunications Operations Support Systems (OSS's) and Business Support Systems (BSS's) that supplement communications infrastructures by performing "invisible" support services such as usage monitoring, service assurance, billing and a range of customer management services.

These are shown generally at 20 and 21.

It will be appreciated is that certain aspects of the data traffic passing across the various communications networks will be user-specific, in that the data, for example, carries the identity of the communicating parties, the infrastructure and particular service used to implement the communication, the time of the communication and its duration. Each of these data types may constitute elements of a user's profile, with it being a primary function of the network interface layer to pass network traffic information of this type to the data conversion layer 12. It will be understood, by those well-versed in the relevant art, that user-specific/profile-based elements of the various data traffic streams can be identified using dedicated data fields and/or data headers, with parsing elements such as proxies (see below) being operative to parse/filter the data traffic and to extract the user-specific/profile-based data. As most communications protocols contain a degree of profile-related information, the various parsing elements may therefore be configured in a protocol-specific manner, whereby profile-related data may be extracted from a particular protocol's data traffic stream.

As shown, the data conversion layer 12 is provided, in this example, by an array of proxies (in this case eight), each of which is dedicated to the receipt, conversion and transmission of a particular type of communications network data. Thus, the proxies (conveniently proxy servers) 12a to 12h are each "tuned" to a particular type of communications network data, and are configured to convert aspects of that data into a format that is suitable for storage in the data storage layer 13.

Thus, the proxy 12a is a Home Location Register/Home Subscriber Server (HSS) proxy, that is configured to push and pull information to and from a HLR or HSS, which typically will be received in a Mobile Application Part (MAP) or ISDN User Part (ISUP) format—the common signalling protocols used for inter-MSC communication in the GSM (Global System for Mobile Communications) environment.

Proxy 12b—a SCP proxy—is operative to receive both MAP and TCAP (Transaction Capability Application Part) protocols, and, as such, is able to receive network data that is utilised for connectionless signalling such as that required with SS7 switch-to-database and database-to-database communications. Whilst proxies 12a and 12b are both described in relation to mobile telecommunications networks, it will of course be understood that similar considerations may apply in the case of a Public Switched Telephone Network (PSTN).

Both the proxies 12a and 12b (as with each of the other proxies) are provided with an XML converter that is able to effect a conversion between MAP/TCAP and XML data formats. Whilst the other proxies 12c to 12h are also able to effect an XML conversion, the data formats with which the conversion may be effected of course differ, in accordance with the proxies' particular role.

The SCP proxy 12b is also able to perform a XML/INAP (Intelligent Network Application Part) protocol conversion. As with the TCAP protocol, INAP is used in European SS7 networks to query data stores on issues not concerned with call set-up and tear down.

Security proxy 12c is operatively associated with network security elements such as Mobile Authentication Centres (AuC's) that form part of the GSM environment and which are used to check subscriber information against user and telephone registers. AuC's allow verification of this type of information to be effected, subsequent to which the subscriber's HLR is informed of the satisfactory ("pass") result, thus allowing a call to be made. The security proxy 12c is also operative to receive RADIUS (Remote Authentication Dial-In User Service) authentication server transmissions, with the proxy 12c thus effectively being privy to users' security credentials such as authentication patterns, ID codes and the like, and operative to gather and distribute this information to the data storage layer, in the unitary (XML) format. By placing such security information in a unitary repository, authenticated and authorised access to a variety of different communications networks can be achieved via a single UPMS scheme.

Proxy 12d is an additional/back-up SCP proxy, whereas proxy 12e is a J2EE (Java 2 platform, Enterprise Edition)/Enterprise Application proxy. Proxy 12e is thus entrusted with the receipt, conversion and transmission of enterprise network data traffic, and as such may monitor data flow in database management systems, transaction monitors, naming and directory services and the like.

Proxy 12f, on the other hand, is a Parlay/JAIN proxy, adapted for use with Next Generation Networks (NGN's). Such NGN approaches are likely to become more prevalent in the furniture and it is therefore important that the user profile management system is sufficiently forward-looking to accommodate them. In brief, Parlay application programming interfaces are open and technology-independent thus allowing multiple-network and cross-platform operation in a variety of different environments. Similarly, JAIN-based API's allow IP and Intelligent Network (IN) protocols to be integrated—thus giving rise to so-called integrated networks—which allow a marked departure from proprietary closed systems to occur. However, as explained in relation to proxies 12a and 12b, interfaces with existing protocols such as ISUP, TCAP, INAP, MAP and H.323 will also be provided. The latter standard (an ITU standard) allows real-time voice and video conferencing over packet-based networks, with an important feature being its interoperability with a number of multi-media services networks. Similarly, conversion from other IP telephony signalling protocols such as MGCP (Media Gateway Control Protocol) and MEGACO (Media Gateway Controller) is also provided for. The latter protocols are in essence similar to both SIP and H.323 protocols, although they are designed for implementation in IP telephones of somewhat lower cost. Inclusion of the Parlay/JAIN proxy, in conjunction with the proxies 12a and 12b, thus allows the user profile management system to gather profile information originating in IP-based PSTN and PLMN networks through appropriate interfaces or through a single JAIN/Parlay interface where translation from existing protocols can be effected.

Proxy 12g (a OSS [Operational Support System]/BSS [Business Support System]) proxy is effective to monitor data relating to the OSS/BSS parts of the various underlying networks with it being envisaged that the OSS/BSS proxy will be able to communicate with service brokers that constitute an important part of the distributed computing approaches embodied by Hewlett Packard's "E-speak" and Hewlett Packard's "Smart Internet usage" middleware tool. In brief, both the "E-speak" and "Smart Internet Usage" approaches are designed particularly for use in e-commerce and corporate environments to allow relevant data to be collected and aggregated in a readily manageable manner by concentrating on the nature of the resource or information required rather than its specific physical attributes or likely location. Billing information obtained from the BSS allows user profile data relating to subscribers' prepaid accounts, free airtime and call types to be monitored, and passed to the data storage layer in the unitary (XML) format.

The proxy 12h (a User Provisioning Proxy) allows users and network service providers to give some personalised information themselves to the profile management system and thus to instigate a degree of user personalisation of a number of services with which the management system is in contact. For example, a user may access the provisioning proxy 12h using a web-based client such as an Internet browser over a HTTP connection, thus facilitating user-driven updating and amendment of the user profile store.

Overall, the network interface layer and data conversion layer provide a gateway between a number of communications networks and the logically superposed aggregation layer, thus allowing any user profile component of the gathered information to be filtered, and subsequently passed to the data storage layer. The "future-proof" nature of the network interface and data conversion layers means that the profile management system can be readily updated, simply by incorporating additional proxy modules that are able to provide an XML output in response to a specified network input.

In a particularly preferred embodiment, each of the data conversion layer proxies is able to convert extant user profile data from an XML format into a format appropriate to the relevant underlying network infrastructure. Thus, appropriate profile information can be passed from the data storage layer to the underlying network via the intermediaries of the data conversion and network interface layers, conveniently pushing the thus-converted profile information into a cache to make the information available at service run time. In essence, therefore, this allows an automated and self-fulfilling system to operate, in that user profile data gleaned from a particular communications network can be passed, in an appropriate format, to a quite different communications network, to the benefit of the subscriber. For example, where a subscriber agrees a change in his/her quality of service (QoS) or Service Level Agreement (SLA) with a particular network service, this information can be passed to his/her user profile data store, and returned, for example, to a different communications network, in an appropriately different format, to allow the second network provider to offer a comparable amendment to the second network provider's QoS or SLA.

The second major component of the management system is the aggregation layer 13, which comprises a profile collector 22, a profile selector 23 and a profile distributor 24. The profile collector 22 is charged with the collection, from the data conversion proxies, of profile data, and the dispatch of the profile data to the profile selector. The profile selector, on the other hand, is charged with identifying an appropriate sector within the data storage layer for the various types of user profile data that it receives from the profile collector. Lastly, the profile distributor 24 is responsible for pushing the profile data to the various proxies and profile repositories and also for receiving profile data from the various data storage layer repositories and passing the profile data back to the profile collector. As explained in more detail hereinafter, the manner in which the profile data are processed and distributed is codified in a distribution scheme contained within a user profile model repository which itself is located in a particular sector of the data storage layer. A security policy, contained within a security policy repository, also located within the data storage layer, determines the various rights of access that relate to certain user profile data types and thus govern what type of information may be passed to the data conversion layer, and thus, eventually, to the underlying communications networks.

Whilst a number of possible implementations for the aggregation layer are envisaged, a MOM (Message-Oriented Middleware) approach is thought likely to be suitable. MOM allows applications to be distributed over multiple, dissimilar, platforms and allows data to be exchanged on an inter-program basis without the necessity of either program knowing the specific technical characteristics of the other. This publish/subscribe approach is embodied in Talarian's "Smart Sockets"® software and Tibco's Rendezvous™ message systems. The latter is thought to be particularly appropriate, as Rendezvous messages are platform independent and are provided with a user-extensible system that gives support for data formats such as XML.

Alternatively, Java-based solutions such as J2EE and JMS (Java Message Service) API's could be used, to interconnect a number of different applications throughout an enterprise network. Alternatively, JNDI (Java Naming and Directory Interface) provides a distributed approach that provides applications and programs with a single location in which desired resources can be located. The advantage of JNDI is that disparate directories operating with different protocols can be accommodated, providing a convenient portal between the user profile management system and other, proprietary, directory-based infrastructures. The Java Transaction API (JTA) also specifies high-level gateways between the various parties involved in a distributed transaction system, and it is also thought that JTA may be suitable in the aggregation layer implementation. Finally, it is also envisaged that an approach based on the Common Object Request Broker Architecture (CORBA) may be suitable: this object-oriented infrastructure simplifies many networking tasks such as object registration, procurement and activation and again relies on the use of an intermediate broker, thus reducing the burden on the object-requesting application.

The third principal element of the management system is the data storage layer 14 which encompasses a security policy repository 25, an aggregation rules repository 26, a user profile (UP) models repository 26 and a number of profile repositories 28a, 28b, and 28c. In brief, the security policy repository contains information that governs when, how and under what conditions user profile data can be passed from the profile repositories 28 to the aggregation layer and thus back to the underlying communications networks. The rules repository, on the other hand, governs which aspects of the user profile data can be modified/added to and deleted, and under what circumstances. The profile distributor in the aggregation layer, responsible (amongst other things) for pushing profile data to the profile repositories 28, uses information elicited from the rules repository 26 to indicate whether or not a particular profile data change will be allowed.

The UP models repository 27 contains a number of "templates" for unitary user profile data stores and thus communicates with the rules repository to allow rule updating to occur. Thus, where it is decided to effect a change to a UP model (perhaps by adding a further UP field) it is important that the rules are modified accordingly, so that the profile distributor is able to determine whether or not changes may be made to the new field, and under what conditions. The profile repositories themselves (28a, 28b and 28c) constitute "completed" versions of the UP models, in that the various fields and attributes are complemented with appropriate values. As shown, the profile repositories are in communication with a publish/subscribe communication bus 29, which itself is in communication with the components of the aggregation and data conversion layers. The user profile data contained within the profile repositories 28 is provided in an XML format, with access to the information conceivably being facilitated by the use of a directory access protocol such as LDAP. In order to effect this, a XML to LDAP translation will be required: alternatively, direct XML storage could be utilised in an XML-capable RDBMS (Relational Database Management System).

Referring next to FIG. 2, this shows one example of the type of data that can be contained within the profile repositories 28 of FIG. 1. As shown, the information is categorised in terms of its nature ("Field"), utility (what the information is for), whether it is dynamic or static and whether the data is transient or persistent. In this regard, dynamic data is data that is liable to change on an ongoing basis, such as a user's location. Static data is generally invariable, such as user name and user ID information. Transient data includes a user's location and details of a user's current Internet connection. The different between static and persistent data is best explained by way of example: the fact that a particular invoice is unpaid constitutes persistent data but it is not static, as the debt could be cleared at some point in the future. Whether or not the data is shared by various service providers is also shown, as is the public or private nature of the data. A user name or user ID is likely to be public information, whereas a user's IP address, mobile telephone number or e-mail address could well be private. A distinction is also drawn between local and remote data types: local information is that which the user is likely to want to disseminate, such as his/her location, whereas remote information is not affected by the user's current whereabouts, such as his/her home telephone number and user ID. The distributed/non-distributed distinction is also best explained using the example of a prepaid billing account. The fact that a prepaid account is used could be of use to a number of potential service providers and could thus be distributed to them. However, a subscriber's actual account number need not be passed to each service provider, with it being sufficient for the service providers to be able to effect, in some way, a debit of the account concerned. The account number data could thus be non-distributed. Referring next to FIG. 3, an additional example of the type of data that can be contained within the profile repositories 28 of FIG. 1 is shown. By way of background information, the data shown in FIG. 3 relates, in conceptual terms, to a "real life" implementation of the system in a 3GPP (Third Generation Partnership Project) environment, in which service aggregation, service personalisation and multi-modal services are commonplace, as featured in the UMTS (Universal Mobile Telecommunications Service) "VHE" (Virtual Home Environment) scenario. In this example, it should be understood that a Mobile Operator hosts the UPMS system, with it being understood, however, that the UPMS system could alternatively be hosted/provided by a dedicated service provider or distributed over different operators' infrastructures.

The implementation scenario is based around a user (Peggy Smith) who has a UMTS handset that is provided, for example, with multimedia capabilities such as voice, video and text, and which is Internet Protocol enabled. A 3G mobile operator hosts Peggy Smith as a subscriber, with the operator thus providing a service portal which Peggy can personalise, combining services to benefit from a variety of inter-linked services, as follows.

As Peggy travels regularly and cancelled/delayed flights are common, she would like, under such circumstances, automatically, to be offered some video movies, via her handset, to pass the time whilst waiting for her delayed flight. This should occur regardless of her physical location: in other words, when she is roaming. The offer of a video movie should be made on the basis of her movie style preferences and her movie service usage history, in order to avoid repetitive offers and a complex end-user selection interface.

In this scenario, therefore, a content service provider entitled "Airport Service" offers a location-based service including a "Boarding Gates Updates Notifications" service entitled "Flight-service", in a number of different European (for example) International airports.

An on-line video service provider entitled "Movie Service" provides multimedia services (music and video movies) entitled "Video Service" and "Music Service". The Movie Service provider has its own subscriber profile database and hosts Peggy's media (music and video) preferences.

The Mobile Operator hosts the UPMS and provides a service portal to Peggy, a Mobile Operator subscriber. Peggy holds a prepaid account with the Mobile Operator, with it being her wish to be billed using only this account, regardless of the number—and nature—of other services which she makes use of.

FIG. 3 represents the three main facets of this scenario, in that the "Operator Hosted Common Profile" contains top level subscriber information such as Peggy's full name, e-mail address, a list of services to which she has subscribed and details of her pre-paid account. As shown, her name data is distributed in that this information is passed freely to other service providers, so that Peggy does not have to provide this information more than once. On the other hand, her name data is not shared, in that other service providers are not able to use Peggy's name to access other types of data contained within the Operator Hosted Common Profile. Peggy's prepaid account details are not distributed beyond the Operator Hosted Common Profile, for security reasons, but the account is shared, in that other service providers can effect a debit of the account, despite the fact that the account is held centrally by the Mobile Operator. Further, the services to which Peggy subscribes (e.g. Airport Service) are also not distributed, and neither is this information shared.

The Airport Service profile repository contains details of the services to which Peggy has subscribed (in this case Flight Service) although this information is neither distributed nor shared to/with the other service providers. The fact that her preferred billing mode is "prepaid" is distributed, so that other service providers are aware of this, and are thus instructed to effect an appropriate debit when their services are provided, although her prepaid account details are not distributed to other services, but are shared, in that the various services make use of the same prepaid account.

The Movie Service profile repository contains data relating to the specific services, provided by the Movie Service, to which Peggy has subscribed, in addition to preference data relating to her choice of movie styles. This information, being of no interest to non-movie service providers, is neither distributed nor shared to/between such other providers, although it can be used to tailor the type of movies that are offered to Peggy as and when an appropriate situation arises.

Overall, as will be understood from the preceding examples, the invention provides a flexible, platform-independent, open-architecture and future-proof user profile management system that is able to operate on a cross-network basis, and which thus allows hitherto disparate profile data types to be convened in a central repository, for possible access and use by a number of other communications networks.

From a subscriber's point of view, the system provides a centralised and single access point with a centralised authentication process, which simplifies user-driven updates to profile data repositories. From a service provider viewpoint, it enables the gathering, processing and distribution of cross-platform user profile data which can be used to tailor network services in accordance with user preferences. From a business viewpoint, this allows service providers to improve their quality of service and to improve service level agreements, thus potentially reducing customer dissatisfaction and possible switches to alternative service providers.

In the present specification "comprises" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. In a communications environment, a system for managing user profile data, comprising:
    a) a network interface layer operatively associated with a communications network,
    b) an aggregation layer operative to extract from network data traffic user profile data and provide the user profile data to a data storage layer, wherein the network data traffic comprises at least a signaling protocol data traffic stream,
    c) the data storage layer, operative to store user profile data relating to the communications network, wherein the data storage layer comprises a rules repository accessible by the aggregation layer, the rules contained within the repository influencing the operation of the aggregation layer, and
    d) a data conversion layer, functionally disposed between the network interface and the data storage layers and which is capable of converting the user profile data into a plurality of communications network formats, wherein the user profile data is converted and passed from the data storage layer to network infrastructure via the data conversion layer and network interface layer in a communications network format utilized by the network infrastructure.

2. A system according to claim 1 wherein the data conversion layer is capable of making bi-directional contact with the network interface layer whereby a plurality of communications network data formats may be converted into a user profile data format compatible with the data storage layer.

3. A system according to claim 2 wherein the user profile data is provided in a tagged or tag-based format.

4. A system according to claim 2 wherein the user profile data is provided using an Internet mark-up language.

5. A system according to claim 1 wherein the user profile data is provided in a single format.

6. A system according to claim 1 wherein the aggregation layer operative to convene user profile data relating to a plurality of different communications networks.

7. A system according to claim 6 wherein the aggregation layer has a push/pull relationship with the data conversion and data storage layers.

8. A system according to claim 6 wherein the aggregation layer comprises a data store selector operative to effect storage of user profile data in appropriate sectors of the data storage layer.

9. A system according to claim 1 further comprising a user access module operative to receive information from a user or subscriber and to effect or request a change, where appropriate, in the user profile data contained within the data storage layer.

10. A system according to claim 9 wherein the user access module forms part of the network interface layer.

11. A system according to claim 9 wherein the user access module is receptive to information transmitted using a web-based protocol.

12. A system according to claim 1 wherein the network interface layer is operatively associated with a plurality of communications networks.

13. In a communications environment, a system for managing user profile data, comprising:
   a) a network interface layer operatively associated with a plurality of different communications networks,
   b) an aggregation layer operative to extract from network data traffic user profile data and provide the user profile data to a data storage layer, wherein the network data traffic comprises at least a signaling protocol data traffic stream,
   c) a data storage layer, operative to store user profile data relating to the communications networks, wherein the data storage layer comprises a rules repository accessible by the aggregation layer, the rules contained within the repository influencing the operation of the aggregation layer, and
   d) a data conversion layer, functionally disposed between the network interface and data storage layers and which is capable of effecting a conversion between a plurality of communications network formats and a user profile format, whereby a plurality of communications networks have access to the data storage layer, thus enabling services to be provided using such networks that are tailored in accordance with the user profile data, wherein the user profile data is converted and passed from the data storage layer to network infrastructure via the data conversion layer and network interface layer in a communications network format utilized by the network infrastructure.

14. A system according to claim 13 wherein the network interface layer is operatively associated with a plurality of communications networks.

15. In a communications environment, a system for managing user profile data, comprising:
   a) a network interface layer operatively associated with a communications network and comprising a user access module receptive to information transmitted using a web-based protocol and operative to receive information from a user or subscriber and to effect or request a change, where appropriate, in the user profile data contained within the data storage layer;
   b) a data storage layer, operative to store user profile data, provided in a single tagged or tag-based format, relating to the communications network;
   c) a data conversion layer, functionally disposed between the network interface and the data storage layers and which is capable of converting the user profile data into a plurality of communications network formats; and
   d) an aggregation layer having a push/pull relationship with the data conversion and data storage layers and operative to convene user profile data relating to a plurality of different communications networks from network data traffic comprising at least a signaling protocol data traffic stream, the aggregation layer comprising a data store selector operative to effect storage of user profile data in appropriate sectors of the data storage layer,
   wherein the data conversion layer is capable of making bi-directional contact with the network interface layer whereby a plurality of communications network data formats are converted into a user profile data format compatible with the data storage layer and the data storage layer comprises a rules repository accessible by the aggregation layer, the rules contained within the repository influencing the operation of the aggregation layer,
   wherein the user profile data is converted and passed from the data storage layer to network infrastructure via the data conversion layer and network interface layer in a communications network format utilized by the network infrastructure.

16. A system according to claim 15 wherein the network interface layer is operatively associated with a plurality of communications networks.

* * * * *